United States Patent [19]

Klancher

[11] Patent Number: 5,132,867
[45] Date of Patent: Jul. 21, 1992

[54] METHOD AND APPARATUS FOR TRANSFER BUS PROTECTION OF PLURAL FEEDER LINES

[75] Inventor: Frank Klancher, Coral Springs, Fla.

[73] Assignee: ABB Power T&D Company, Inc., Blue Bell, Pa.

[21] Appl. No.: 473,499

[22] Filed: Feb. 1, 1990

[51] Int. Cl.⁵ .................... H02H 3/00; H02H 7/00
[52] U.S. Cl. .................................................. 361/62
[58] Field of Search ............... 361/62, 67, 64, 63, 361/93, 96; 307/113, 116

[56] References Cited

U.S. PATENT DOCUMENTS

| | | | |
|---|---|---|---|
| 4,377,836 | 3/1983 | Elms et al. | 361/96 |
| 4,476,511 | 10/1984 | Saletta et al. | 361/96 |
| 4,876,625 | 10/1989 | Wolfe | 361/93 |

Primary Examiner—Steven L. Stephan
Assistant Examiner—E. To
Attorney, Agent, or Firm—Richard V. Westerhoff

[57] ABSTRACT

A microprocessor based tie relay controls a tie circuit breaker between a main bus and a transfer bus to which any one of a number of feeder lines may be connected through a disconnect switch when the feeder circuit breaker associated with that feeder line is out of service. Settings for the protection characteristics of each of the feeder relays controlling the feeder circuit breakers are stored in non-volatile memory together with a default protection characteristic suitable for protecting any of the feeder lines. The appropriate protection characteristic for the feeder line connected to the transfer bus is selected for use by the tie relay in controlling the tie circuit breaker. This selection may be made manually by an operator, or preferably automatically by the microprocessor of the tie relay which monitors the states of the feeder circuit breakers and of the disconnect switches and selects the settings associated with the feeder line whose feeder circuit breaker is open and disconnect switch is closed. If the microprocessor does not recognize only one feeder line connected to the transfer bus, the default protection characteristic is selected and an alarm is generated.

12 Claims, 3 Drawing Sheets

METHOD AND APPARATUS FOR TRANSFER BUS PROTECTION OF PLURAL FEEDER LINES

BACKGROUND OF THE INVENTION

1. Field of the Invention

This invention relates to the protection of multiple feeder lines in an electric power distribution system in which the feeder lines are each connected to the main bus through a feeder circuit breaker and in which any one of the feeder lines can be selectively alternatively connected to the main bus through a transfer bus protected by a single tie circuit breaker. More particularly, the invention relates to improved protection of the feeder lines when connected to the main bus through the transfer bus and tie circuit breaker.

2. Background Information

A common configuration for substations in an electric power distribution system comprises a number of feeder lines each connected to a main bus by its own circuit breaker. Each of the circuit breakers is controlled by a protective relay having a protection characteristic adapted to the characteristics of the associated feeder lines.

In order to permit a feeder circuit breaker to be taken out of service, such as for maintenance or replacement, while providing continued service to the feeder line, each of the feeder lines is connected to a common transfer bus by a disconnect switch. The transfer bus is connected to the main bus by a single tie circuit breaker. When a feeder circuit breaker is to be taken out of service, that circuit breaker is opened to disconnect the associated feeder line from the main bus. The associated disconnect switch is then closed to connect the affected feeder line to the transfer bus. When this connection has been made, the tie circuit breaker is closed to connect the feeder line to the main bus. The tie circuit breaker then provides protection for the feeder line until the feeder circuit breaker can be returned to service.

The tie circuit breaker is also controlled by a protective relay. The protective relay for the tie circuit breaker must have a protection characteristic which will adequately protect any of the feeder lines which may be connected to the transfer bus If the characteristics of all of the feeder lines do not differ too widely from one another, a single protection characteristic suitable for the longest feeder line can be used by the protective relay for the tie circuit breaker This will provide over protection for the other feeder lines, and hence could lead to false trips of the tie circuit breaker An alternative approach has been to dispatch a relay technician to manually change the settings of the tie circuit breaker protective relay to those of the protective relay for the feeder circuit breaker which has been taken out of service. This is a time consuming and expensive procedure which is subject to errors in the insertion of the new settings Another approach to accommodating for the different characteristics of the feeder lines which could be connected to the transfer bus has been to provide switches which scale the inputs to the protective relay for the tie circuit breaker to accommodate for variations in feeder line characteristics. Again, such a procedure requires a technician, is time consuming, expensive, and prone to errors.

The trend today is for the conventional electromechanical protective relays to be replaced by microprocessor based protective relays. Microprocessor based relays provide more options in establishing the protection characteristics of the protective relay and hence, provide a possibility of many more settings Such relays may in fact have several dozen settings. While many of these settings may be common for all of the feeder lines, there are still a great many settings that need to be made to adapt the protection characteristics of the tie circuit breaker protective relay to those of the protection relay on the circuit breaker which has been removed from service.

There is a need therefore for an improved scheme for protecting feeder lines when a dedicated feeder circuit breaker is removed from service.

There is a more particular need for an improved scheme for providing adequate protection without excessive overreach for any one of a number of feeder lines using a single tie circuit breaker controlled by a single protective relay.

There is an additional need for a scheme for adapting the protection characteristics of the protective relay of the single tie circuit breaker to the characteristics of the feeder line which the tie breaker connects to the main bus.

There is also need for such a scheme which is reliable, accurate and low in cost.

There is a further need for such a scheme which can be implemented automatically.

There is a still further need for such a scheme which provides default protection if indications are not clear which feeder line is connected to the transfer bus.

SUMMARY OF THE INVENTION

These and other needs are satisfied by the invention which is directed to a method and apparatus for the protection of feeder lines in an electric power distribution system. In accordance with the invention, the settings for the protection characteristics for each of the feeder relays controlling the feeder circuit breakers in each of the feeder lines are stored in a non-volatile memory accessible by the microprocessor in a microprocessor based tie relay controlling the tie circuit breaker between the main bus and a transfer bus to which a feeder line is connected through a disconnect switch when the feeder circuit breaker associated with that feeder line is taken out of service If a single feeder line is connected to the transfer bus, the protection characteristic for that feeder line is selected for operation of the tie relay in controlling the tie circuit breaker. If the identification of the feeder line connected to the transfer bus is unknown or ambiguous, a default protection characteristic is selected for use by the tie relay. This default protection characteristic is selected to provide protection for any of the feeder lines, and thus in specific cases, may provide over protection for some of the lines.

The selection of the protection characteristics for use by the tie relay can be made manually by an operator, and can be done remotely. Preferably, however, the selection is made automatically by the microprocessor in the tie relay. The microprocessor monitors the state of the circuit breakers and of the disconnect switches. If only one disconnect switch is closed and the corresponding feeder circuit breaker is open, the protection characteristic for the associated feeder line is selected by the microprocessor If the microprocessor cannot determine such a condition, but at least one of the disconnect switches is closed, it automatically selects the default characteristic. If the microprocessor detects an unacceptable switch configuration, an alarm is generated.

The invention embraces both the method and apparatus for implementing the invention.

BRIEF DESCRIPTION OF THE DRAWINGS

A full understanding of the invention can be gained from the following description of the preferred embodiment when read conjunction with the accompanying drawings in which.

BRIEF DESCRIPTION OF THE PREFERRED EMBODIMENT

Figure 1:
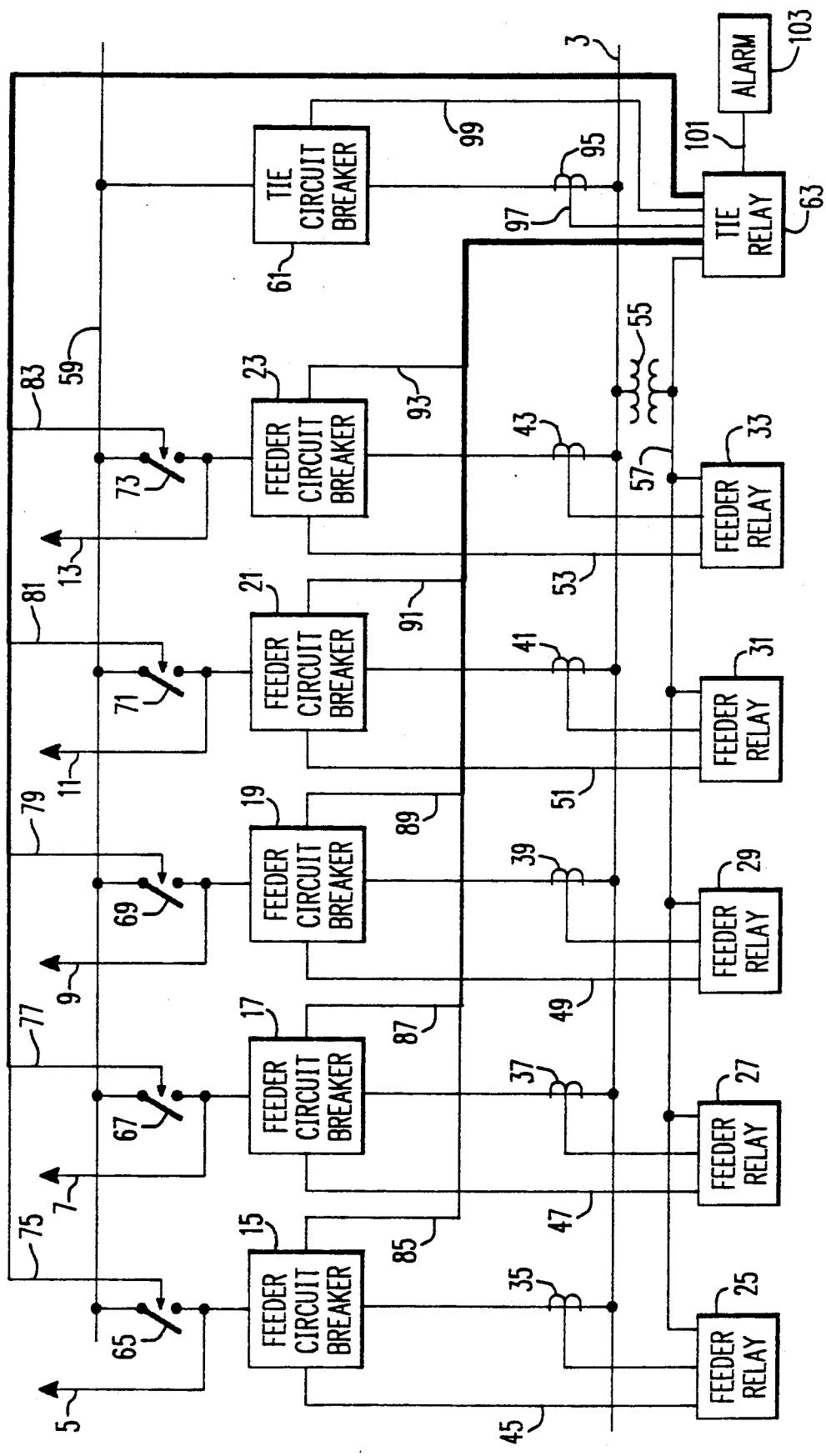
FIG. 1 is a schematic diagram of a portion of an electric power distribution system incorporating the invention.

Referring to FIG. 1, the invention is shown as applied to an electric power distribution system 1 having a main bus 3 providing power to a number of feeder lines, in this case five feeder lines 5, 7, 9, 11 and 13. The main bus and the feeder lines may all be three-phase; however, a single line is shown for the main bus and each feeder line for clarity. Each of the feeder lines 5 through 13 is connected to the main bus 3 through a circuit breaker 15, 17, 19, 21 and 23, respectively. Each of the circuit breakers is controlled by a protective relay 25, 27, 29, 31 and 33. The protective relays monitor the currents in the associated feeder lines through current monitors 35, 37, 39, 41, 43, respectively. The relays receive signals from the circuit breakers indicating the open/closed state of the breaker and provide control signals to the respective circuit breakers over connections 45, 47, 49, 51 and 53.

A common potential transformer 55 provides system voltage to each of the relays over lead 57. In order to provide the capability of removing one of the circuit breakers 15-23 from service while providing continued service to the associated feeder line 5 through 13, the common transfer bus 59 is provided. The transfer bus 59 is connected to the main bus 3 by a tie circuit breaker 61. The tie circuit breaker 61 is controlled by a protective relay 63.

The feeder lines 5 through 13 can be selectively, individually connected to the transfer bus by an associated disconnect switch 65, 67, 69, 71 and 73, respectively. The state of these disconnect switches is transmitted to the tie circuit breaker protective relay 63 over leads 75, 77, 79, 81 and 83, respectively. The open/closed state of the feeder circuit breakers 15 through 23 is also transmitted to the relay 63 over leads 85, 87, 89, 91 and 93, respectively.

The tie circuit breaker protective relay 63 also receives a signal representative of the current through the tie circuit breaker 61 generated by the current transformer 95 over lead 97, and the voltage signal generated by the potential transformer 55 on the lead 57. The relay 63 receives the open/closed status of the circuit breaker and sends signals operating the tie circuit breaker 61 over connections 99.

Each of the feeder relays 25 through 33 has a protection characteristic adapted for the associated feeder line. Typically, these feeder relays are distance relays which monitor the current and voltage in the protected feeder line and compute a complex line impedance which is compared with a reach characteristic to determine if there is a fault on the protected line. Typically, such distance relays have several zones of protection at ever increasing distances along the protected feeder line from the associated circuit breaker. Depending upon the condition sensed by the relay, it can trip only one phase or all three phases of the associated feeder circuit breaker depending upon the type of fault. The feeder relays 25-33 may be electromechanical relays or microprocessor based relays. In the exemplary system, the feeder relays are microprocessor based relays. Such relays may be easily programmed to provide wide variations in the protection characteristics provided by the relay. Such relays, can have dozens of settings. Typically, the microprocessor based distance relay also provides overcurrent protection which may be adjusted as desired through additional settings in the relay. If the characteristics of the individual feeder lines are quite similar, the various settings in the feeder relays can be very similar However, the characteristics of the individual feeder lines could be quite different thereby requiring a wide variation in settings of the respective feeder relays.

Circuit breaker trouble or periodic maintenance may demand that a feeder circuit breaker be taken out of service. This requires that the associated feeder line be connected to the transfer bus for connection to the main bus through the tie circuit breaker 61 in order to remain in service. This transfer must be accomplished in a precise manner. First, the feeder circuit breaker is opened (the breaker could then be isolated for maintenance by disconnect switches on either side of the breaker—not shown). The disconnect switch 65 through 73 for the affected feeder line is then closed. The tie circuit breaker 61 must be open when the disconnect switch is closed since these switches are not capable of switching high currents. Once the disconnect switch is closed, the tie circuit breaker 61 is closed to connect the affected feeder line to the main bus. The tie circuit breaker 61 then provides protection for the affected feeder line. The tie relay 63 must therefore have a protection characteristic appropriate for the affected feeder line.

In accordance with the invention, the tie relay 63 is also a microprocessor based relay. This relay stores a set of settings for establishing a protection characteristic for each of the feeder lines. Where the feeder relays 25 through 33 are microprocessor based relays, this is accomplished by storing the same settings used by the feeder relays in the tie relay. For electromechanical feeder relays, the tie relay stores settings which provide the same protection characteristic as the electromechanical relay. When a feeder circuit is connected to the transfer bus, the selection of the appropriate stored protection characteristic setting can be made manually by an operator. This can be done remotely Preferably, however, the tie relay 63 automatically selects the appropriate protection characteristic settings. This is accomplished by monitoring the position of the disconnect switches 65 through 73 and the open/closed states of the feeder circuit breakers 15 through 23. A valid configuration for normal operation of the invention is only one feeder circuit connected to the transfer bus, the associated circuit breaker open and the tie breaker closed. With this combination of switches, the tie relay can determine which feeder line is connected to the transfer bus and select the settings for the appropriate protection characteristic. In accordance with the invention, if the tie circuit breaker received ambiguous information as to what feeder line is connected to the transfer bus, a set of default settings are selected. These default settings provide a conservative protection characteristic for the worst case. In this instance, the tie relay 63 generates a signal on an output line 101 which activates an alarm 103.

Figure 2:
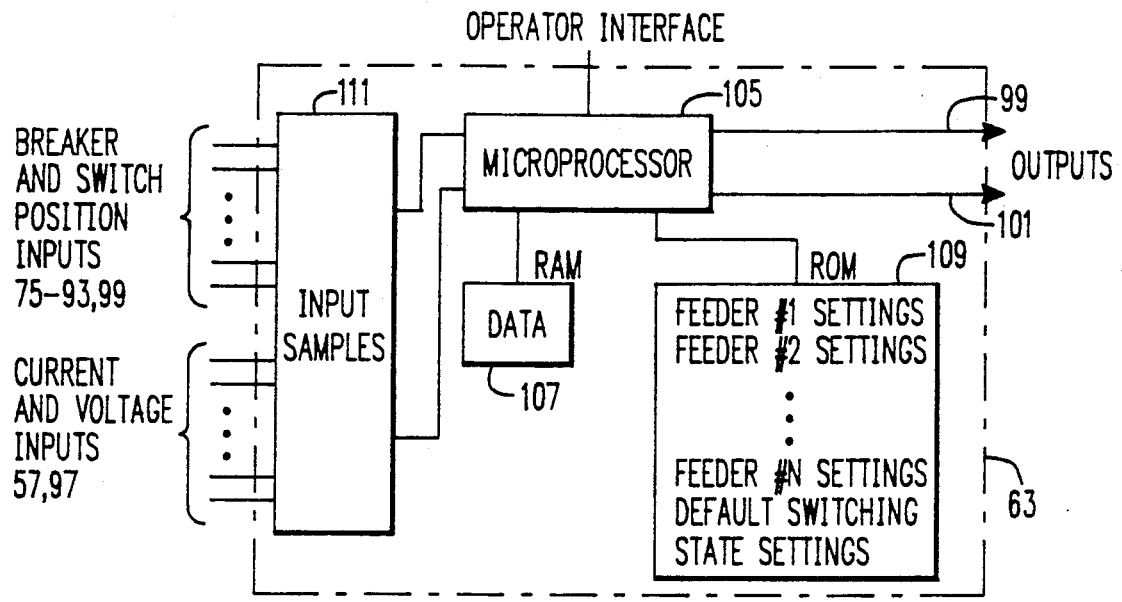
FIG. 2 is a schematic diagram of a tie circuit breaker protective relay in accordance with the invention which forms a part of the electric distribution system enclosed in FIG. 1.

FIG. 2 illustrates schematically the major components of the tie relay 63. The heart of the relay is a microprocessor 105. Connected to the microprocessor 105 is a random access memory (RAM) 97 which stores data generated by the microprocessor In addition, non-volatile, read only memory (ROM) 109 in which are stored the feeder settings for each of the feeder relays and the default switching state settings is also connected to the microprocessor 105. As mentioned previously, the set of settings for each feeder relay and for the default setting include values for the numerous parameters needed to define the different protection characteristics. The relay 63 also includes an input device 111 which samples and digitizes input signals which include the circuit breaker position signals transmitted over the connections 85 through 93 and 99 and the disconnect switch positions which are transmitted over the connections 75 through 83. The representative voltage signal provided on lead 57 and the current through the tie circuit breaker provided on lead 97 are also input to the microprocessor 105. While single line representations are used in FIG. 1 for clarity, it will be recalled that the electrical system shown is a three-phase system, and hence there are three phase voltages and three-phase currents provided to the microprocessor Based upon the switch position, the microprocessor 105 implements the protection characteristic determined by the appropriate settings recovered from the ROM 109. In implementing the appropriate protection characteristic, the microprocessor 105 generates outputs such as trip signals transmitted to the tie circuit breaker 61 over the connection 99 and alarm signals to the alarm 103 over the lead 101.

Figure 3A:
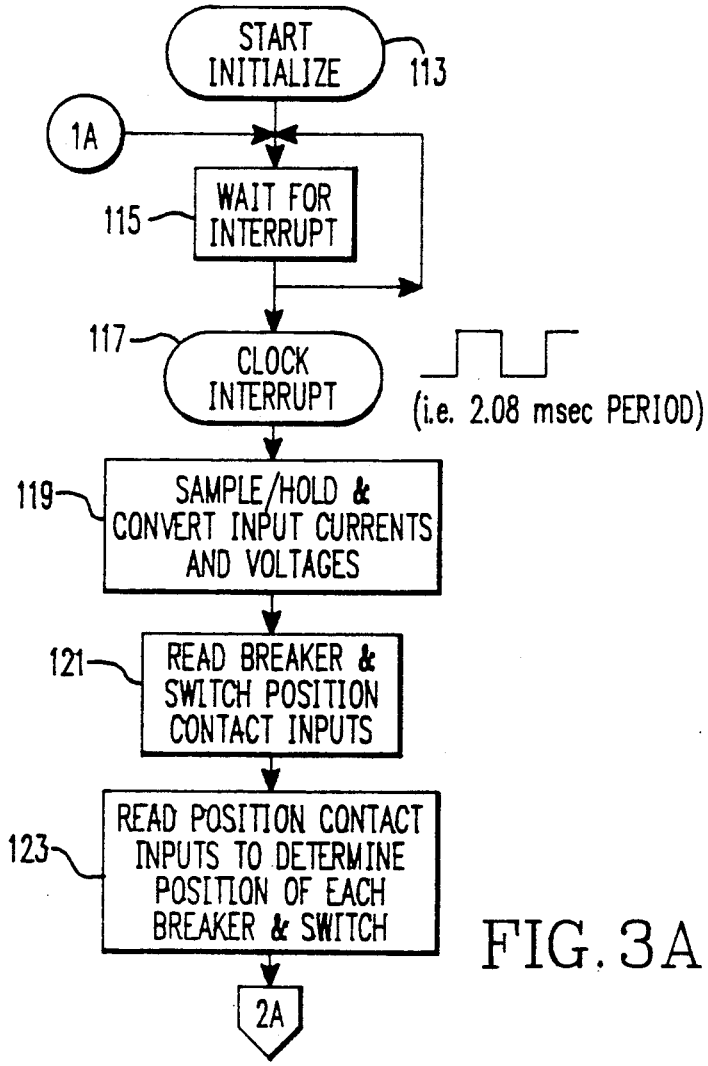
FIGS. 3A, 3B and 3C illustrate a flow chart of a suitable computer program for operating the tie circuit breaker protective relay disclosed in FIG. 2.
Figures 3B, 3C:
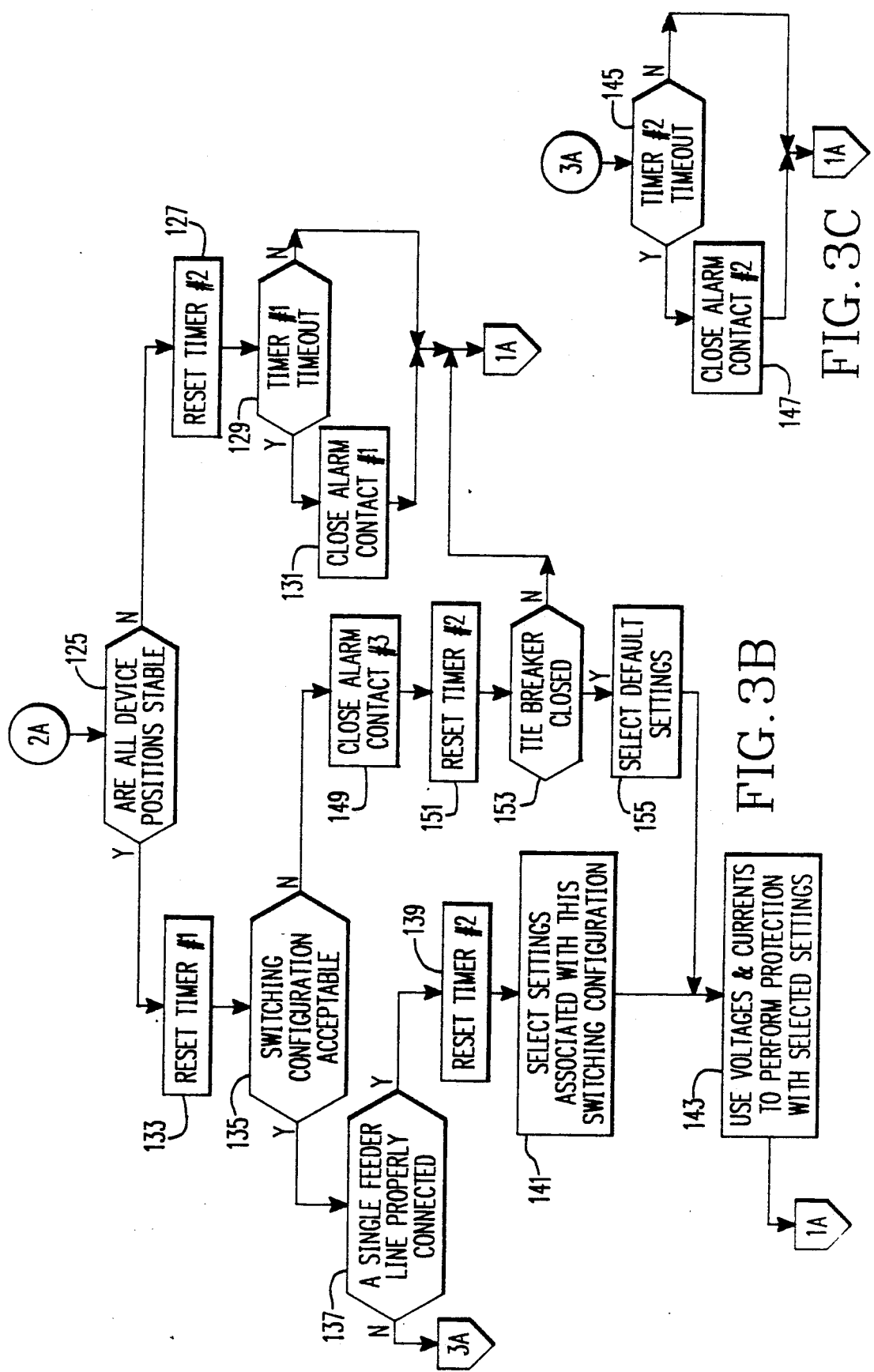

A flow chart for a suitable program for the microprocessor 105 to implement the invention is shown in FIGS. 3A, 3B and 3C with alpha-numeric tags illustrating the flow between figures. As indicated at 113, all the parameters are initialized on start-up. A loop is then entered at 115 in which the program waits until a clock interrupt is generated at 117. In response to an interrupt, the input currents and voltages are read at 119 followed by the circuit breaker and switch position contact inputs at 121. The position contact inputs are then processed at 123 to determine the position of each circuit breaker and switch. This processing includes debouncing and transition timing. A determination is then made at 125 as to whether all of the device positions are stable. The program includes two timers. Timer number 1 allows time (typically a few cycles) for the device positions to stabilize. Timer number 2 allows time for the switching sequence needed to connect the feeder line to the main bus through the transfer bus and tie circuit breaker to be completed. This can be several minutes, where a technician must go out into a yard and execute the switching sequence.

Returning to FIG. 3B, if all of the device positions are not stable as determined at 125, timer number 2 is reset at 127. Timer number 1 is then checked at 129, and if it has not yet timed out, the program loops back to wait for the next interrupt.

On subsequent runs of the program, if timer number 1 has timed out and all of the device positions have not yet stabilized, an alarm is generated at 131.

If on a run on the program, all of the device positions are stable at 125, then timer number 1 is reset at 133 and a determination is made at 135 as to whether the switching configuration detected is acceptable. By acceptable, it is meant that either a single feeder line is connected through the transfer bus and tie circuit breaker to the main bus and its associated feeder circuit breaker is open, or the switch positions indicate an interim state which could lead to a single feeder line being properly connected through the tie circuit breaker. For instance, a feeder circuit breaker may be open and the associated disconnect is closed to co the affected feeder line to the transfer bus, but the circuit breaker has not yet been closed.

If the switching configuration is acceptable at 135, a check is made at 137 to determine if a single feeder line is properly connected. This would occur, for instance in the above example when the tie circuit breaker was closed to complete the connection of the single feeder line to the main bus through the transfer bus and tie circuit breaker. If a single feeder line is properly connected, timer 2 is reset at 139 and the protection characteristics settings associated with this switching configuration are selected at 141. These selected settings are then used together with the currents and voltages to perform the protection function of the tie circuit breaker using the protection characteristic of the relay for the feeder circuit breaker associated with the feeder line which is now connected through the tie circuit breaker as indicated at 143. The program then loops back to block 115 to wait for the next interrupt.

If the switching configuration as determined at 135 is acceptable, but the proper switch for position for a single line connected to the transfer bus has not yet been detected at 137, timer number 2 is checked at 145. This timer allows a preselected period of time for the proper switching sequence to be completed. If timer number 2 has not yet timed out, the program loops back and waits for the next interrupt. However, if the proper switching sequence has not completed within the time set by timer number 2, another alarm is generated at 147 before the program loops back for the next interrupt.

If the switching configuration detected at 135 is not acceptable, a third alarm is generated at 149. Unacceptable switch positions would include, for instance, two disconnect switches closed. Following generation of the alarm, timer number 2 is reset at 151, and the tie circuit breaker is checked at 153. If the tie circuit breaker is not closed, the program loops back and waits for the next interrupt. However, if the tie circuit breaker is closed, default settings are selected at 155. These default settings are then utilized at 143 to provide the protection function.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An electric power feeder protection system comprising:
   a main bus;
   a plurality of feeder lines;
   a plurality of feeder circuit breakers each connecting one of said feeder lines with which it is associated to said main bus;
   a plurality of feeder circuit breaker protective relays each controlling an associated oen of said feeder circuit breakers using a selected protection characteristic selected for the feeder line which the associated feeder circuit breaker connects to the main bus;
   a transfer bus;
   a plurality of disconnect switches each selectively connecting one of said feeder lines with which it is associated to said transfer bus,
   a tie circuit breaker connecting said transfer bus to said main bus; and
   a tie circuit breaker protective relay having storage means storing said protection characteristics for each of said feeder circuit breaker protective relays as stored protection characteristics, selection means selecting the stored protection characteristic of the feeder circuit breaker protective relay associated with a designated feeder line for which the associated feeder circuit breaker has been opened and the associated disconnect switch has been closed to connect the designated feeder line tot he transfer bus as a selected protection characteristic, and control means controlling said tie circuit breaker using the selected protection characteristic.

2. The system of claim 1 wherein said selection means, includes means responsive to the opening of one of said feeder circuit breakers and the closing of the associated disconnect switch to automatically designate the feeder line associated with said one circuit breaker as the designated feeder line and to automatically select as the selected protection characteristic the stored protection characteristic of the feeder circuit breaker protective relay associated with the designated feeder line.

3. The system of claim 2 wherein said selection means includes monitoring means responsive to said disconnect switches and to said circuit breakers which permits selection of a stored protection characteristic for a protective relay associated with said one feeder line only when the disconnect switch associated with the one feeder line is the only disconnect switch which is closed and the associated feeder circuit breaker is open.

4. The system of claim- 3 wherein said monitoring means include alarm means generating an alarm when more than one disconnect switch closed and when only one disconnect switch is closed but associated feeder circuit breaker is also closed.

5. The system of claim 3 wherein said storage means includes means storing a default protection characteristic providing protection for any of said feeder lines and, wherein said monitoring means selects the stored default protection characteristic as the selected protection characteristic when more than one disconnect switch is closed and when only one disconnect switch is closed but the associated feeder circuit breaker is closed.

6. The system of claim 5 wherein said monitoring means includes alarm means generating an alarm when more than one of said disconnect switches are closed and when only one disconnect switch is closed but the associated feeder circuit breaker is closed.

7. The system of claim 6 wherein said alarm means also generates an alarm if said tie circuit breaker does not close within a predetermined time interval from when said one disconnect switch closes.

8. A method of providing adaptable protection for an electric power system including a plurality of feeder lines each having its own electrical characteristic and each fed from a common main bus through an associated feeder circuit breaker which is controlled by an associated protective relay, a transfer bus connected to said main bus through a tie circuit beaker controlled by a tie circuit breaker protective relay, and a plurality of disconnect switches each selectively connecting a feeder line to said transfer bus, said method comprising the steps of:
   operating the associated protective relay for each feeder circuit breaker with a protection characteristic selected particularly for the electrical characteristic of associated feeder line;
   storing the protection characteristics for each of said protective relays associated with the feeder circuit breaker for each feeder line in said tie circuit breaker protective relay controlling said tie circuit breaker;
   sequentially opening the feeder circuit breaker associated with a selected feeder line closing the disconnect switch connecting the selected feeder line to the transfer bus and closing the tie circuit breaker; and
   operating the tie circuit breaker protective relay to select the stored protection characteristic of the protective relay associated with the feeder circuit breaker for the selected feeder line, and to control the tie circuit breaker using the stored protection characteristic selected.

9. The method of claim -8 including monitoring the disconnect switches and feeder circuit breakers and generating an alarm if more than one disconnect switch is closed and when only one disconnect suit but the associated feeder circuit breaker is also closed.

10. The method of claim 9 including generating an alarm if the tie circuit breaker is not closed within a preselected time interval after a disconnect switch is closed.

11. The method of claim 8 including storing a default protection characteristic which provides protection for any of the feeder lines, monitoring the disconnect switches and said feeder circuit breakers, and selecting said default protection characteristic to control the tie circuit breaker when said disconnect switches and feeder circuit breakers provide an ambiguous indication of which feeder line is connected to the transfer bus.

12. The method of claim 11 including generating an alarm when said disconnect switches and feeder circuit breakers provide said ambiguous indication of which feeder line is connected to said transfer bus.

* * * * *

UNITED STATES PATENT AND TRADEMARK OFFICE
CERTIFICATE OF CORRECTION

PATENT NO. : 5,132,867
DATED : July 21, 1992
INVENTOR(S) : FRANK KLANCHER

It is certified that error appears in the above-identified patent and that said Letters Patent is hereby corrected as shown below:

Column 6, line 17, "co" should be --connect--.

Claim 1, column 7, line 9, "oen" should be --one--.

Claim 1, column 7, line 30, "tot he" should be --to the--.

Claim 4, column 7, line 55, --is-- should be inserted after "switch".

Claim 4, column 7, line 56, --the-- should be inserted after "but"..

Claim 9, column 8, line 46, "suit" should be --switch is closed--.

Signed and Sealed this

Second Day of August, 1994

BRUCE LEHMAN

Attest:

Attesting Officer

Commissioner of Patents and Trademarks